Figure 1:
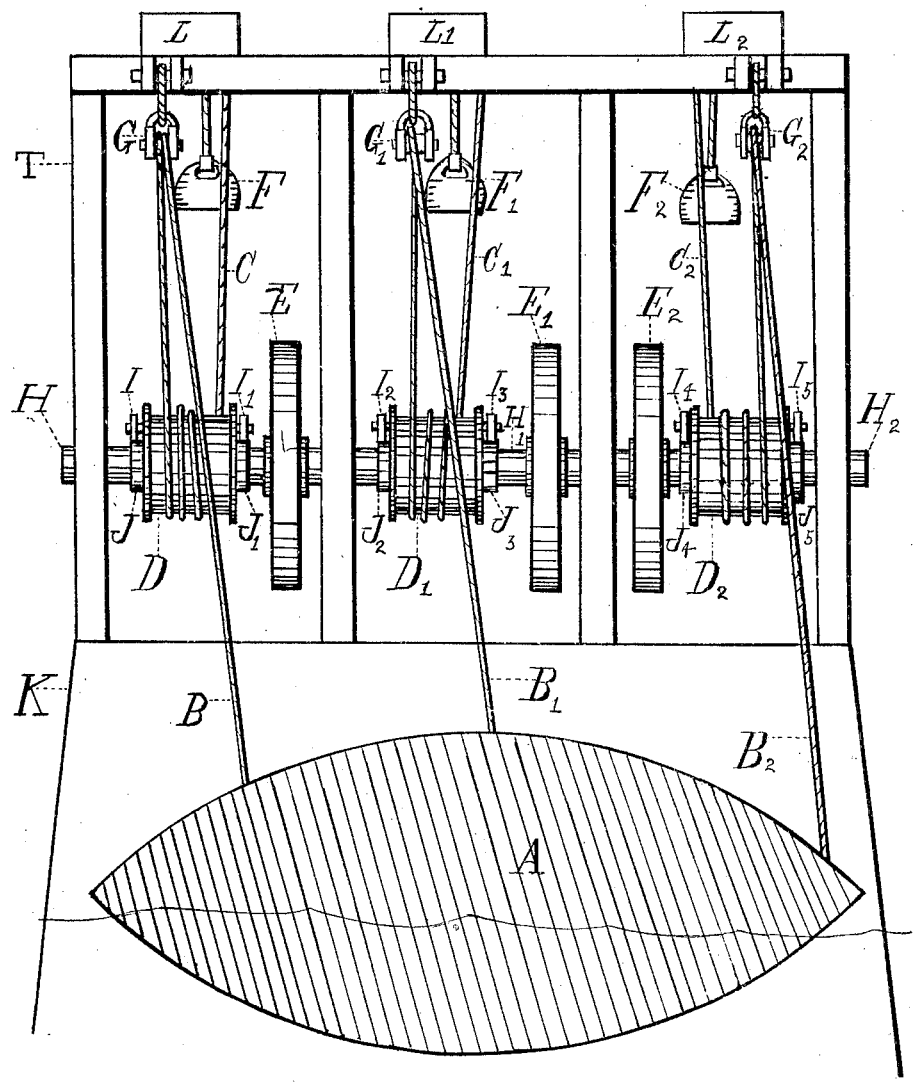

W. A. CRAWFORD-FROST.
WAVE ENERGY MOTOR.
APPLICATION FILED JAN. 28, 1920.

1,346,399.

Patented July 13, 1920.
2 SHEETS—SHEET 1.

WITNESS

William A. Crawford-Frost
INVENTOR.

W. A. CRAWFORD-FROST.
WAVE ENERGY MOTOR.
APPLICATION FILED JAN. 28, 1920.
1,346,399.
Patented July 13, 1920.
2 SHEETS—SHEET 2.
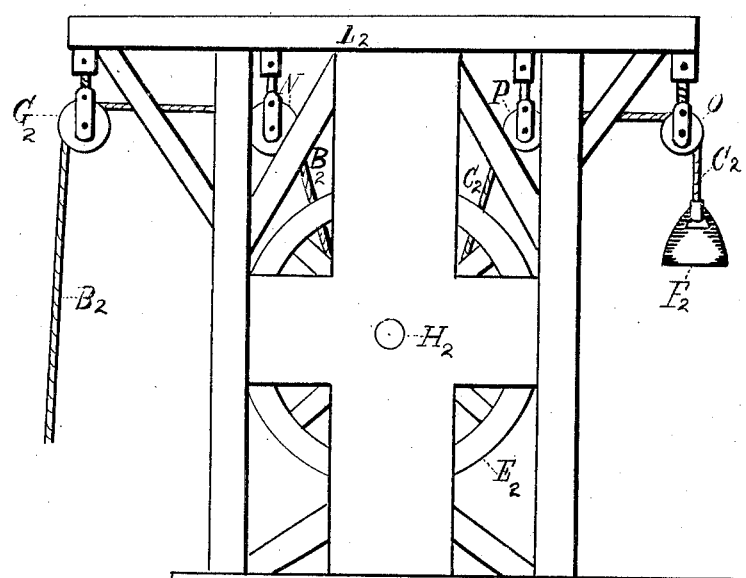
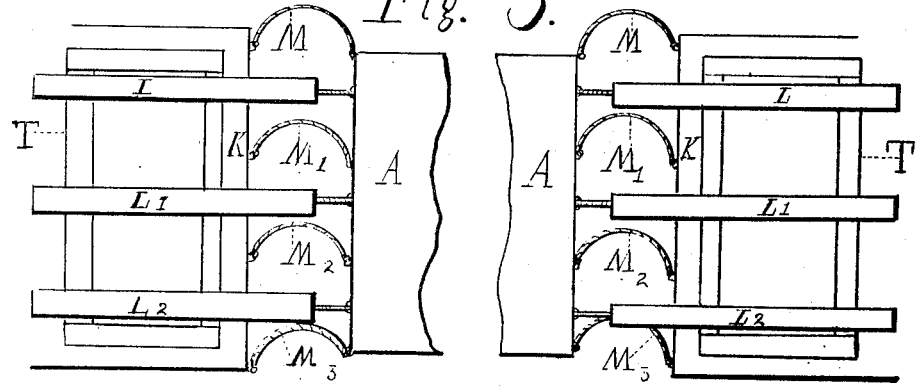
William A. Crawford-Frost
WITNESS:

UNITED STATES PATENT OFFICE.

WILLIAM A. CRAWFORD-FROST, OF BALTIMORE, MARYLAND.

WAVE-ENERGY MOTOR.

1,346,399.  Specification of Letters Patent.  Patented July 13, 1920.

Application filed January 28, 1920. Serial No. 354,743.

*To all whom it may concern:*

Be it known that I, WILLIAM A. CRAWFORD-FROST, a citizen of the United States of America, residing in the city of Baltimore, in the State of Maryland, have invented certain new and useful Improvements in Wave-Energy Motors, of which the following is a specification, reference being had therein to the accompanying drawings, in such full and clear terms as will enable those skilled in the art to construct and use the same.

This invention relates to wave-energy motors and its chief object is to provide a wave-energy motor which shall apply the power of the waves to suitable driving mechanism regardless of storms, or wave heights at any stage of the tides, producing an amount of horse power units sufficient to compete with steam power in the generation of electricity after paying cost of installation, upkeep and overhead charges.

This invention aims to accomplish the above results by a combination of mechanical elements that will be hereinafter specifically described and then claimed, and reference will now be had to the drawings, wherein there are illustrated the principles of my invention, in which:—

Figure 1 is a front elevation of a motor in accordance with this invention, showing a cross section of a float, a pier and tower, and the cables and machinery used therewith. Fig. 2 is a side elevation of a tower showing the relative positions of the driving and drum-reversing cables; and Fig. 3 is a plan view of a float, between two piers and towers, with the machinery removed, showing how the float is preferably moored by slack cables between the piers.

Further describing my invention with reference to the drawings, like letters denote corresponding parts throughout: A is a long, narrow float, the drawing, Fig. 3, showing same cut in two in the middle, the length being preferably not less than 100 ft. and the width and depth thereof being the smallest that will give the required strength, located so that its broadside will be exposed to the incoming waves, and being moored by its narrow ends to the piers K, K, by any number of slack cables M, M$^1$, M$^2$, etc., the cables being sufficiently strong and numerous, and of sufficient length, to allow the full rise and fall of the float at all times, and yet to prevent, when taut, the float from hitting either pier. T, T, are towers built on the said piers, each tower being independent of the other and the two towers not being connected to each other by any superstructure, each pier with its tower being a likeness of the other except that they face in opposite directions. From a cape, or headland, one of the piers could be built on land and the other in the water. From the beams L, L$^1$, L$^2$, of the towers, pulleys are suspended. B, B$^1$, B$^2$, are driving cables attached to the ends of the float and passing over the main driving pulleys G, G$^1$, G$^2$, thence over any desired number of pulleys and descending to revolve the drums D, D$^1$, D$^2$, which revolve the shafts H, H$^1$, H$^2$, by means of the spring pawls I, I$^1$, I$^2$, I$^3$, I$^4$, I$^5$, on the drums, binding on the ratchets J, J$^1$, J$^2$, J$^3$, J$^4$, J$^5$, which are fixed on the shafts. C, C$^1$, C$^2$, are cables which reverse the drums as the float rises, said cables passing over pulleys and being actuated by the weights F, F$^1$, F$^2$, which rise as the float falls, and fall as the float rises. E, E$^1$, E$^2$, are driving wheels keyed to the shafts H, H$^1$, H$^2$, and which run dynamos by any of the usual mechanical means, such as trains of large and small wheels operated by belts, or chains and sprockets, or by trains of gears and pinions, or by the mechanism known as turbo-gears, for speeding up rotation.

Operation: When the waves cause the float to rise, the cables B, B$^1$, B$_2$, attached to the float, become slack, but the weights, F, F$^*$, F$^2$, pull down on the pulley O and the other pulleys in the same series, and they move the drums contra-clockwise thus winding up the cables B, B$^1$, B$^2$, on the drums and taking up the slack. When the float falls downward into the trough of the wave, the cables B, B$^1$, B$^2$, pull down on the pulleys G, G$^1$, G$^2$, and, after passing over the intermediate pulleys, descend and revolve the drums clockwise, thus causing the pawls to bind on the ratchets and revolve the shafts clockwise and revolve the driving wheels E, E$^1$, E$^2$, thus running the dynamos. During the downward motion of the float the clockwise revolution of the drums winds up the cables C, C$^1$, C$^2$, on the drums and raises the weights F, F$^1$, F$^2$. The towers must be of such a height as to allow a rise and fall of the weights as great as the rise and fall of the float in all conditions of the waves and tides, and the higher the towers the straighter will be the downward pull of the cables B, B$^1$, B$^2$, and the less will be the loss of power if a float is used alongside the piers as shown herein.

It is obvious that when a long, narrow float has its broadside exposed to the incoming waves the whole float can be raised uniformly by comparatively low and short waves, and that the arrangement of piers and towers herein shown and described will admit of such a float moored between them with little expense compared to any wave-energy device which would require the float to be surrounded on all sides by a connected structure, as the piers could be built as cheaply 120 ft. apart as 10 ft. apart, thus permitting a float of great weight to be used at a low cost of installation.

It will be seen further from the drawings that, in my device, the shafts, drums and driving wheels are located on the piers so that they can have suitable anchorage for such heavy machinery, and are not suspended high in the air as they would be if they were on any superstructure directly over the float, a saving in construction cost.

Further, this arrangement of shafts on each pier enables any required number of shafts to be built; each shaft, if desired, may have its own drum and driving wheel thus preventing differences of torque in the shafts.

It is believed that the manner in which the cables, towers, pulleys, drums and shafts coöperate with the float in producing a rotary motion of the shafts from the undulatory motion of the waves, will be apparent without further description, and, while in the drawings there is illustrated a preferred embodiment of the invention, it is to be understood that the structural elements thereof are susceptible to such variations and modifications as fall within the scope of the appended claim.

Having thus described my invention, what I claim as new and desire to secure by Letters Patent of the United States is as follows:—

In a wave energy motor, in combination, a plurality of piers, a long, narrow float having narrow ends located between each two adjacent piers and positioned with its broadside presented to the incoming waves, a plurality of slack cables mooring the narrow ends of said float to said piers, a unitary tower structure upon each pier, said structures being independent of each other, shafts supported by said piers, power cables attached to said floats, and transmission mechanism supported by said structures whereby said power cables rotate said shafts upon movement of said floats.

In testimony whereof I have hereunto set my hand this seventh day of April, 1920, in the presence of the subscribed witnesses.

WILLIAM A. CRAWFORD-FROST.

Witnesses:
 NELSON F. MANDELBAUM,
 A. MANDELBAUM.